3,146,548
METHOD FOR TREATING WINDFLOWER BULBS, FOR THEIR PRESERVATION, TRANSPORTATION AND SUBSEQUENT PLANTINGS WITH A VIEW TO FURTHERING THE DEVELOPMENT OF THE FLOWERS
Marius Van Waveren, Avenue des Fleurs, Antibes, Alpes-Maritimes, France
No Drawing. Filed Oct. 4, 1961, Ser. No. 142,775
Claims priority, application France Oct. 12, 1960
3 Claims. (Cl. 47—58)

Hitherto, in order to preserve and ship windflowers or anemones for their subsequent planting with a view to hastening the production of flowers, their bulbs were packed merely in peat after being immersed in water and caused to pass inside a cold chamber; but this manner of operating, although it prevents the bulbs from being killed through drying, has the drawback that the bulbs become too active in a moist medium: not only does the germ grow too much, but also it shoots out roots and exhausts it vitality, so that when it is finally planted, the windflower grows only in an imperfect manner.

My invention has for its object a method which prevents the bulb from shooting roots and allows the bulbs to keep their vital potentiality until they are actually planted, and furthermore, my invention provides the advantage of reducing substantially the shipment costs.

According to my invention, the bulbs of tuberous and rhizomatous anemone species and varieties are immersed in water at room temperature, for a time sufficiently long for them to be soaked completely, generally and preferably during about 48 hours after which they are kept during several days at a low temperature, preferably 4 to 6° C., so that they may dry without losing their water and, lastly, they are packed as they are in a bare condition inside air-impervious bags or the like packages, such as plastic bags. Under such conditions, the bulbs retain just the amount of moisture and air which allows their preservation with reduced activity and when they are finally planted, they grow energetically and form strong plants, for which it is, in fact, possible to adjust the duration of formation of the flower through suitable modifications of the general method of treatment disclosed hereinabove.

I will disclose the detail of an embodiment of my method which may lead to the best result.

The initial immersion in water lasts, in principle, 48 hours at the end of which time the bulb is substantially saturated, but it is possible to still obtain good results by reducing said duration to about 42 hours. The water should be preferably at 15 to 17° C. and should be changed towards the middle of said period of immersion. Colder water would make the germination more difficult and would give the plant formed by the bulb a too large number of flowers of a reduced size.

The drying is performed inside a cold chamber maintained at a temperature of 4 to 6° C.: the bulbs, as soon as they are removed out of the immersion bath, are set inside open-work or latticed boxes or cases which are immediately introduced into the cold chamber. With a higher temperature than that referred to, the bulbs would risk shooting roots and producing later with a lesser number of flowers. With a lower temperature, say 2 to 3° C., the treatment would be longer. With the optimum temperature of 4.5° C. to 5.5° C., the treatment lasts about 7 to 10 days.

The bulbs are finally set in a bare condition inside bags of plastic material or the like airtight or substantially airtight packages which are then closed completely and wherein the bulbs may be kept during several months, the bulbs forming then small germs without shooting any roots until they are planted. The bulbs may thus be shipped inside their bags and this shipping is performed under much cheaper conditions since it is no longer necessary to pay the transportation of a mass of peat and of large cases.

It is desired that the bulbs, when sold to the customers, contain no apparent germ, it is necessary to subject the bulbs carried inside their practically airtight plastic bags and which have been submitted to the treatment described hereinabove, to a lower temperature, say 1 to 2° C. or even below the freezing point, during a variable time, preferably about 15 days or even substantially longer. This latter treatment being ended, it is possible if desired, to dry again the bulbs to complete the process.

If, in contradistinction, it is desired for the bulbs to be provided with a fully apparent germ, while remaining without any root, the temperature of the cold chamber which is at the end of the drying treatment of about 4 to 5° C., is then allowed to rise gradually and slowly during about 4 to 5 days up to about 13° C., which is the optimum temperature for the formation of the germ. Said temperature is kept constant during about 10 days more and the germ is then clearly formed and fully apparent. Once the germ becomes thus apparent, the growth is very slow, and it is possible to keep the bulb during several weeks at room temperature, say between 13 and 23° C., without the advantages of the treatment disclosed being lost.

The bulbs thus prepared are maintained in their plastic bags or the like closed packages until they are planted, said bags being protected against sun and light.

Obviously, the temperatures disclosed hereinabove may vary by a few degrees and the durations mentioned may also be subjected to modification without unduly widening thereby the scope of the invention as defined in the accompanying claims.

What I claim is:

1. A method for the preparation for storage and shipment of tuberous and rhizomatous anemone species and varieties, comprising soaking the tubers and rhizomes of said plants in water at a temperature of approximately 15–17° C. for approximately 42–48 hours, thereafter drying superficially said tubers and rhizomes at a temperature not more than about 6° C. nor substantially below freezing and sealing the dried tubers and rhizomes in packages having greatly reduced perviousness to air.

2. A method as claimed in claim 1, in which the dried tubers and rhizomes are sealed in plastic packages.

3. A method as claimed in claim 1, in which the tubers and rhizomes are further dried for approximately four to five days at a gradually increasing temperature up to about 13° C.

References Cited in the file of this patent
UNITED STATES PATENTS
1,959,510    Van Waveren _____ May 22, 1934

FOREIGN PATENTS
898,794    France _____ July 17, 1944

OTHER REFERENCES
Cloud: "Grow Summer-Flowering Bulbs," published May 1958 in Horticulture (Magazine), vol. 36, No. 5, pages 266 and 294.